(12) United States Patent
Huber et al.

(10) Patent No.: US 8,226,034 B2
(45) Date of Patent: Jul. 24, 2012

(54) CARGO DECK AND A METHOD FOR ASSEMBLING SAID DECK

(75) Inventors: Thomas Huber, Schliersee (DE); Richard Holzner, Rosenheim (DE)

(73) Assignee: Telair International GmbH (DE)

( * ) Notice: Subject to any disclaimer, the term of this patent is extended or adjusted under 35 U.S.C. 154(b) by 913 days.

(21) Appl. No.: 10/565,082

(22) PCT Filed: Jul. 15, 2004

(86) PCT No.: PCT/EP2004/007920
§ 371 (c)(1),
(2), (4) Date: May 22, 2006

(87) PCT Pub. No.: WO2005/012083
PCT Pub. Date: Feb. 10, 2005

(65) Prior Publication Data
US 2007/0176048 A1    Aug. 2, 2007

(30) Foreign Application Priority Data

| Jul. 18, 2003 | (DE) | 103 32 798 |
| Aug. 27, 2003 | (DE) | 103 39 507 |
| Aug. 27, 2003 | (DE) | 103 39 508 |
| Mar. 8, 2004 | (DE) | 10 2004 011 163 |
| Mar. 8, 2004 | (DE) | 10 2004 011 164 |

(51) Int. Cl.
*B64C 1/22* (2006.01)
(52) U.S. Cl. ............................. 244/119; 244/137.1
(58) Field of Classification Search .............. 244/118.1, 244/118.2, 119, 120, 137.1
See application file for complete search history.

(56) References Cited

U.S. PATENT DOCUMENTS

| 2,412,778 A | * | 12/1946 | Kosek | 244/120 |
| 2,625,118 A | * | 1/1953 | Lechner | 410/104 |
| 3,381,921 A | | 5/1968 | McDonough et al. | |
| 3,612,316 A | * | 10/1971 | Baldwin et al. | 414/499 |
| 4,479,621 A | * | 10/1984 | Bergholz | 244/117 R |
| 4,780,043 A | * | 10/1988 | Fenner et al. | 414/502 |
| 4,875,645 A | * | 10/1989 | Courter | 244/137.1 |
| 4,989,809 A | * | 2/1991 | Arnold | 244/137.1 |
| 5,170,968 A | * | 12/1992 | Helmner | 244/137.1 |
| 5,322,350 A | * | 6/1994 | Hinson | 298/1 R |
| 5,827,022 A | * | 10/1998 | Tovani | 410/78 |
| 6,039,288 A | * | 3/2000 | Huber et al. | 244/118.1 |
| 6,070,831 A | * | 6/2000 | Vassiliev et al. | 244/120 |
| 6,554,225 B1 | * | 4/2003 | Anast et al. | 244/117 R |
| 7,338,013 B2 | * | 3/2008 | Vetillard et al. | 244/117 R |
| 7,475,850 B2 | * | 1/2009 | Vetillard et al. | 244/117 R |
| 2006/0065781 A1 | * | 3/2006 | Kress et al. | 244/118.1 |
| 2007/0194175 A1 | * | 8/2007 | Kismarton et al. | 244/120 |
| 2008/0213058 A1 | * | 9/2008 | Simmons et al. | 410/46 |

FOREIGN PATENT DOCUMENTS

| DE | 21 62 042 A | 7/1972 |
| DE | 201 22 116 U1 | 6/2004 |

* cited by examiner

*Primary Examiner* — Joshua J Michener
*Assistant Examiner* — Brian M O'Hara
(74) *Attorney, Agent, or Firm* — Barnes & Thornburg LLP

(57) ABSTRACT

An aircraft cargo deck is provided to receive loads stored in the cargo compartment. The aircraft comprises an outer skin to which longitudinal beams are secured, preferably via ribs attached to the outer skin. To simplify the construction and the assembly of the cargo deck, it is composed of a plurality of floor modules, which are fixed within the cargo compartment and which are mounted on the longitudinal beams.

8 Claims, 17 Drawing Sheets

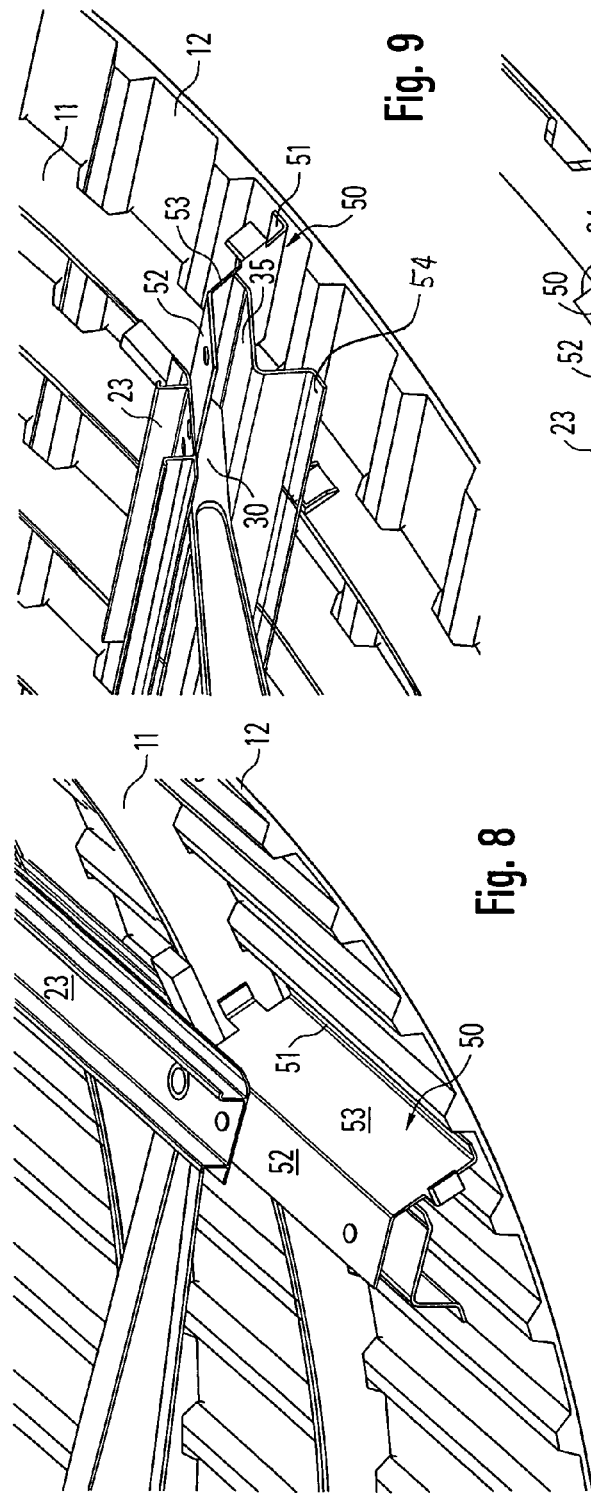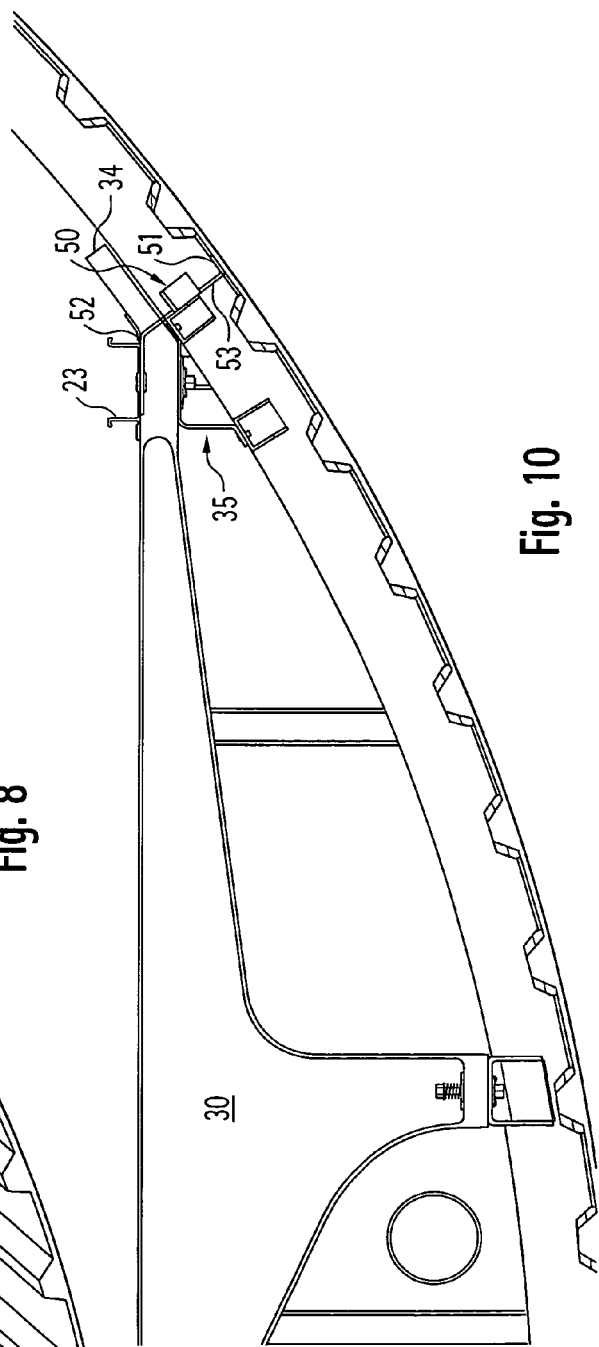

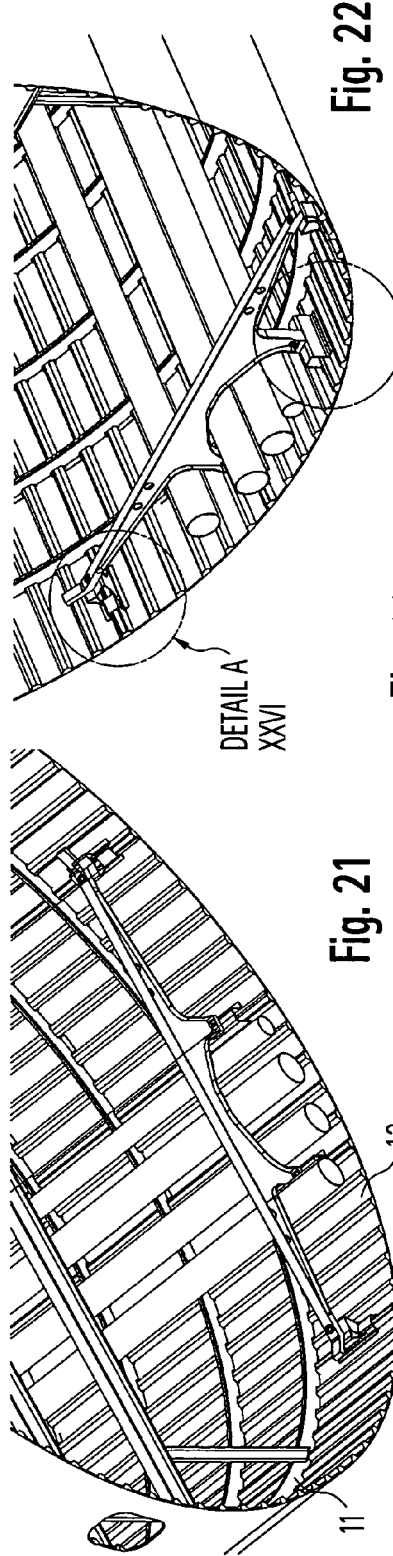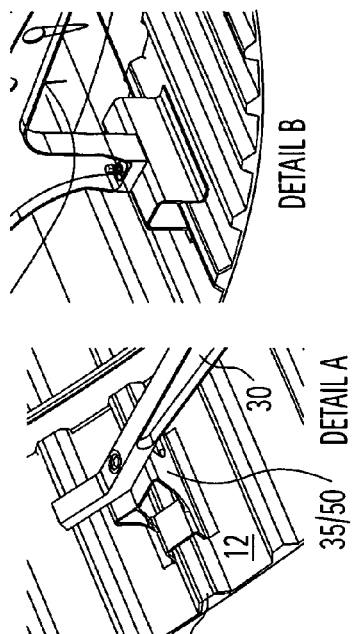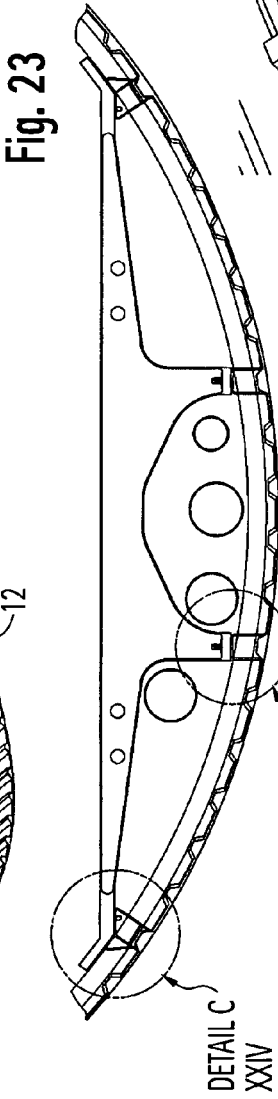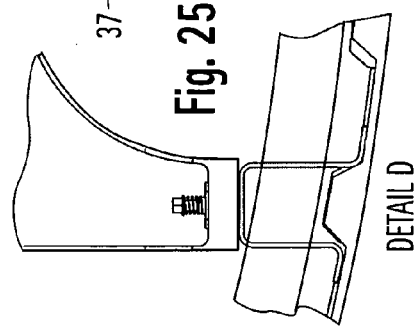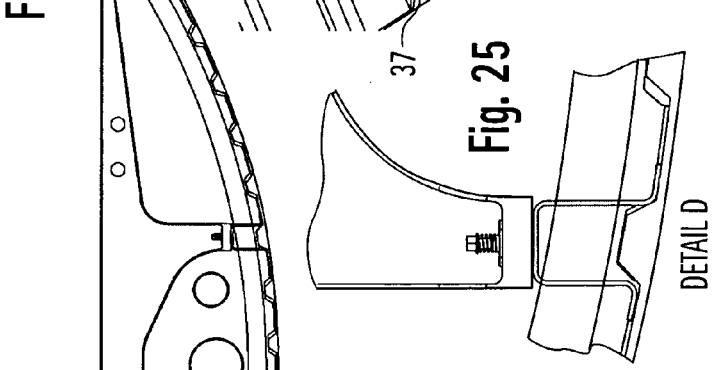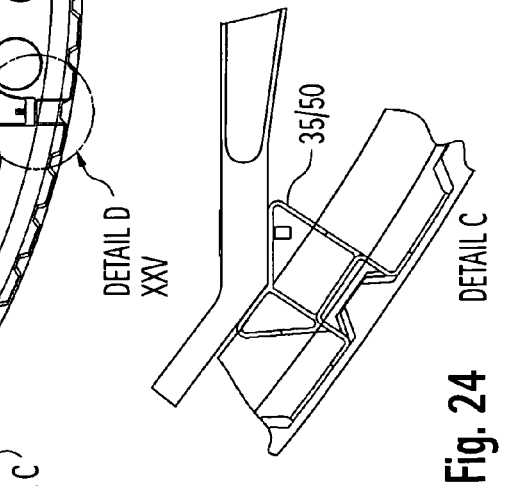

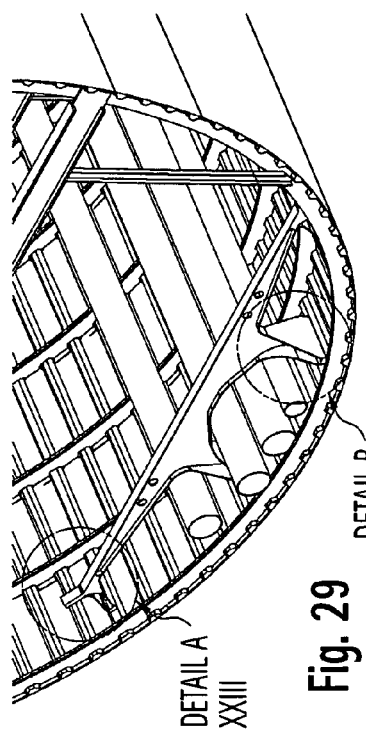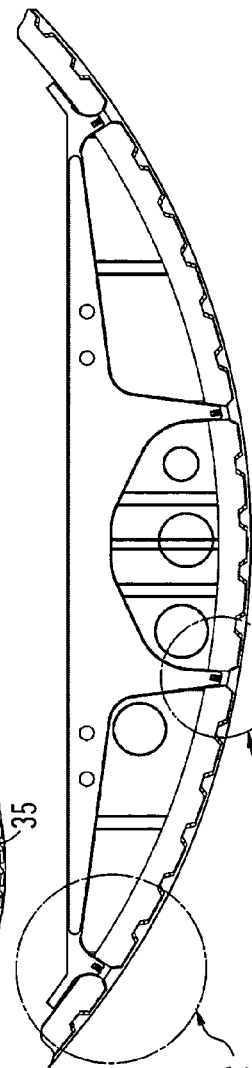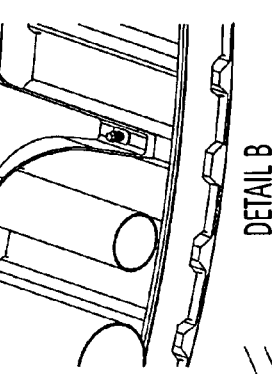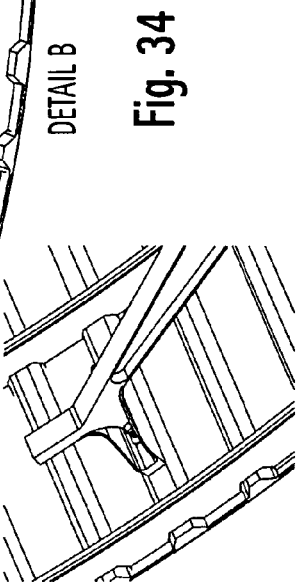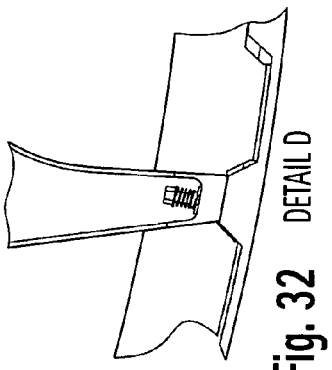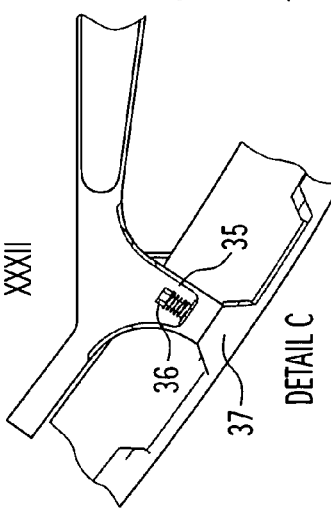

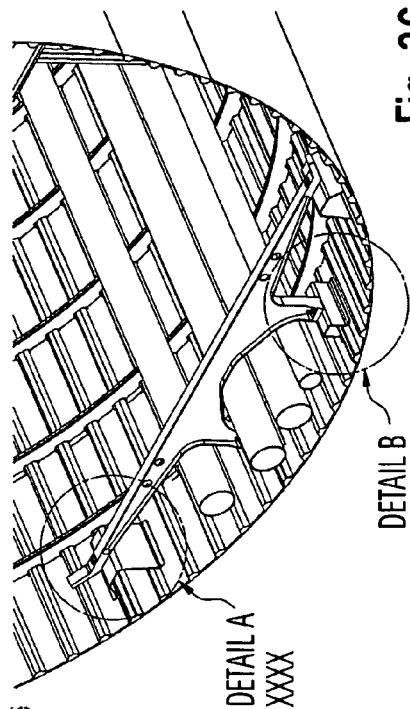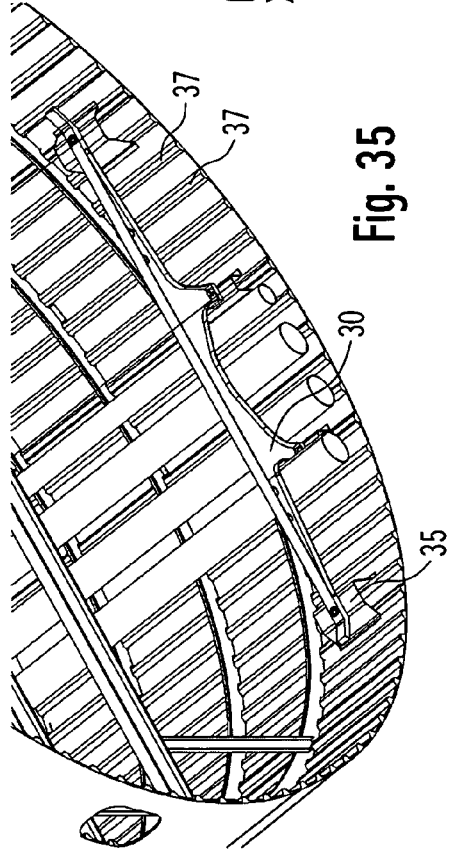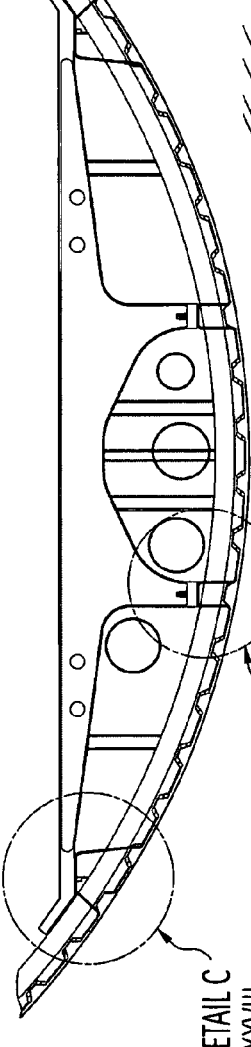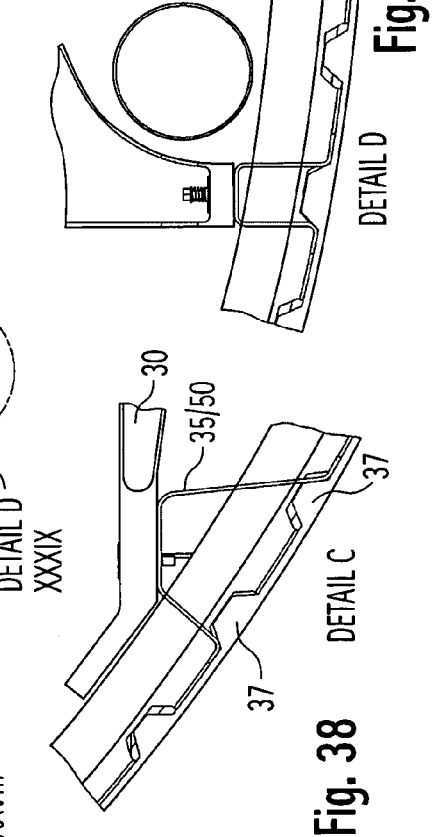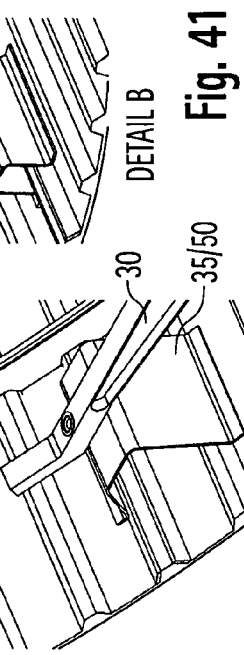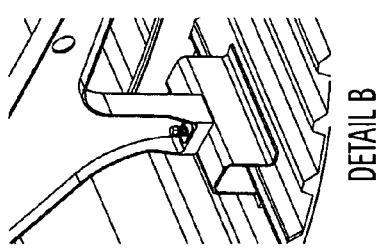

CARGO DECK AND A METHOD FOR ASSEMBLING SAID DECK

CROSS REFERENCE TO RELATED APPLICATIONS

This application claims priority to Patent Cooperation Treaty (PCT) Application No. PCT/EP2004/007920 filed on Jul. 15, 2004 entitled, "CARGO DECK AND A METHOD FOR ASSEMBLING SAID DECK," which claims priority to German Patent Application No. 103 32 798.3, filed Jul. 18, 2003; which claims priority to German Patent Application No. 103 39 507.5, filed Aug. 27, 2003; which claims priority to German Patent Application No. 103 39 508.3, filed Aug. 27, 2003; which claims priority to German Patent Application No. 10 2004 011 163.4, filed Mar. 8, 2004; which claims priority to German Patent Application No. 10 2004 011 164.2, filed Mar. 8, 2004; all of the above disclosures are herein incorporated by reference in their entirety.

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a cargo deck for a cargo compartment of an aircraft as well as to a method of assembling such a cargo deck.

BACKGROUND OF THE INVENTION

From the document DE AS 21 62 042 a cargo deck of this kind is known, in which in the region of a loading-space door a first section of the cargo deck is formed by a plurality of ball mats, PDUs and similar functional units. Adjacent to this entrance region are a plurality of floor panels, between or on which are disposed roller conveyors, latches and additional PDUs, so that items of freight such as containers can be transported in through the cargo-compartment door and then onward, in the long direction of the aircraft, to their final storage position. Once in the storage positions, the containers are anchored by means of latches.

In the conventionally constructed cargo decks transverse beams are initially installed in the fuselage of the aircraft, on which are subsequently mounted profile elements to receive the latches, PDUs or transport rollers, with floor panels or ball mats situated between them. In the region of the cargo-compartment door the construction is still more elaborate. Here a kind of table is installed, on which the said functional units (PDUs, latches etc.) are disposed, and on which the ball mats are mounted (while leaving the PDUs etc. free). In every case, therefore, initially supporting structures are attached to the aircraft fuselage, on which the structures that form the cargo-compartment floor are subsequently mounted. The conventional construction of the cargo deck is thus complicated and furthermore results in a heavy weight.

BRIEF SUMMARY OF THE INVENTION

The object of the invention is to provide a cargo deck and a method for its assembly that reduces complexity, regarding construction as well as manufacture and installation in the aircraft as compared to the prior art.

This object is achieved by the provision of a cargo deck for a cargo compartment of an aircraft with an outer skin wherein said cargo deck is adapted and made up of a plurality of floor modules that are fixed within the cargo compartment and constitute the cargo deck, and at the outer skin of the aircraft longitudinal beams are attached on which the floor modules are mounted. Moreover the cargo deck is adapted to receive loads and comprises a plurality of the floor modules, which are fixed within the cargo compartment as previously discussed and define the cargo deck, and a plurality of longitudinal beams attached to the outer skin on which the floor modules are mounted.

One feature of the invention is that it no longer involves the conventional structure in which the transverse beams are each individually attached to the aircraft fuselage and then the elements that form the cargo-compartment floor are mounted on them. Instead, modules are constructed that comprise sections of the cargo deck including the associated supporting structures (transverse beams), and these modules are then attached as a whole to the longitudinal beams. The result is not only a considerably simplified construction of the cargo deck, because the modules can be (pre-)assembled outside the fuselage of the aircraft; in addition, a considerable simplification is achieved because the modules are not attached directly to the outer skin or the ribs, but rather to the longitudinal beams. That is, whereas during manufacture of the aircraft fuselage there is a degree of tolerance regarding the distances by which the ribs are separated, the longitudinal beams can be finished outside the fuselage and hence with a high degree of precision. This means that the corresponding fixation devices for fixing the modules to the longitudinal beams can be attached accurately, so that when the modules are installed in the aircraft fuselage the entire arrangement can be fitted precisely into position.

Preferably the longitudinal beams consist of a material having a thermal expansion coefficient that corresponds substantially to that of the outer skin. This is especially important when the outer skin of the aircraft consists of a composite material, e.g. carbon-fiber-reinforced plastic, a material that is extremely light. On the other hand, this material is only relatively poorly suitable for construction of a cargo-compartment floor, because it is relatively sensitive to impacts in locally restricted regions. Therefore the cargo-compartment floor is preferably made of light metal, in particular of aluminum components. The modules can now in turn be fixed to the longitudinal beams in such a way that changes in length of the longitudinal beams relative to the modules are accommodated (e.g., owing to corresponding tolerances of the fixation elements). When vertical loads are imposed, such tolerances play no role. To receive loads imposed in the long direction of the aircraft, each of the modules is connected to the outer skin at only two points, which are situated on opposite sides of the cargo compartment.

The longitudinal beams and/or the ribs are preferably provided with bores, rapid-closure elements or similar fixation devices for attachment of the floor modules, so that this simple method of attachment can be used.

The floor modules are attached to the longitudinal beams in such a way that substantially no forces acting in the longitudinal direction of the aircraft can be introduced from the floor modules into the longitudinal beam.

Preferably a single pair of longitudinal beams is provided for connection to the floor modules, i.e. one longitudinal beam on each side of the cargo compartment.

At the floor modules transverse beams are preferably provided, with which to attach the floor modules to the longitudinal beams, so that exactly specifiable fixation points are present. The floor modules or their transverse beams comprise supporting feet for attachment to the ribs. In general two such supporting feet suffice to achieve sufficient stability, but of course it is also possible to use larger numbers of supporting feet. For fixation of the supporting feet to the ribs, the above-mentioned manufacturing tolerances do not play any important role, because the supporting feet can be made elastic in the direction of the aircraft long axis, so that manufacturing differences can easily be compensated. That is, the supporting feet are almost exclusively needed to receive vertical loads, whereas forces in all other directions are transmitted into the outer skin by way of the longitudinal beams and hence the above-mentioned fixation points.

Preferably the ribs for fixation of the modules and/or the longitudinal beams comprise fixation elements that are attached to the ribs either in a zone between the outer skin and an edge region of the rib or else to the edge region itself, in which case no drilling is needed. This measure ensures that the ribs retain their function of stiffening the outer skin, despite the fact that the modules or longitudinal beams are mounted on them.

Preferably the modules are decoupled from one another with reference to forces in the long direction of the aircraft. This achieves a further improvement with regard to the compensation of thermally induced length changes, as well as an increase in assembly tolerance.

Furthermore, the above-mentioned objective is achieved by a method of assembling a cargo deck consisting of floor modules within an aircraft that is constructed from multiple barrel-shaped fuselage sections of an external skin reinforced by ribs, said method comprising at least the following steps:

a) production of floor modules;
b) production of longitudinal beams, including the provision of bores, rapid-closure elements or similar fixation devices for attaching the floor modules to the longitudinal beams;
c) fixation of sections of the longitudinal beams within the fuselage sections;
d) insertion of the floor modules into the fuselage section, and attaching them to the longitudinal beams.

Hence an important idea underlying the method so designed resides in the fact that on one hand the floor modules can be manufactured outside the aircraft fuselage, while on the other hand it is extremely simple to install the floor modules, because of the (lightweight) longitudinal beams, which can likewise be produced outside the aircraft fuselage and make installation of the floor modules very easy. Fixation of the longitudinal beams within the aircraft fuselage is in turn very uncomplicated, likewise because of their low weight and simple construction.

Preferably the longitudinal beams have a length no greater than that of the fuselage modules. As a result, the fuselage modules can be constructed so as to be substantially completely separate from one another, and need not be connected to one another until a final step of assembly has been reached. The transport of such fuselage sections (called "barrels" in technical jargon) can be done at various sites, as is customary in particular when several firms are collaborating on such a major project.

Preferably the step d) above is followed by another step e) in which feet on the transverse beam of the floor module are attached to the ribs. This fixation is relatively simple, because the floor modules are already at substantially the correct place (or have even been attached to the longitudinal beams) and hence at least a vertical positioning has already been correctly carried out.

Preferably after the step e), i.e. after the modules have been fixed in position within the fuselage, lining elements for the walls and ceiling are pushed into the fuselage sections and attached there. During this process the wall and ceiling lining elements have preferably been connected to one another, so that a separate fixation of these two elements with respect to one another during the final installation can be eliminated.

The floor modules can not only be installed in the fuselage sections while these are still separate from one another, but rather it is possible and even necessary, if fuselage sections of a particular length have been selected, to install at least some of the floor modules after the fuselage sections have been put together. In this case the modules and where appropriate also the wall and ceiling linings have preferably been dimensioned such that they can be loaded into the aircraft through the cargo-compartment door, transported to the appropriate destination site and then attached there.

Preferably while the floor modules are still outside the aircraft, i.e. prior to the step d), they are provided with sections of conductors for fluids and/or electrical current, or channels through which conductors or similar installation devices can be passed; after the step d) these are connected to one another. Here, again, it is easy to understand that pre-assembly outside the aircraft considerably facilitates the work of final installation.

Preferably at least parts of floor panels, ball mats or similar deck sections of the modules are fixed to the modules after the step e). This makes it possible to keep the bilge space (below the cargo deck) free for any other mounting procedures that may be undertaken.

The invention will now be described in greater detail with reference to the accompanying drawings.

BRIEF DESCRIPTION OF THE DRAWINGS

FIGS. 8 and 9 are perspective drawings of profile elements and intermediate elements, viewed from different directions, FIG. 10 shows the arrangement according to FIGS. 8 and 9 in a partial section viewed from the front, FIG. 21 is a perspective drawing to explain the fixation of the transverse beams to the outer skin, FIG. 22 is a perspective drawing like that in FIG. 21, but viewed from another angle, FIG. 23 is a front view of the embodiment according to FIGS. 21 and 22, FIG. 24 is a detail view of the section XXIV in FIG. 23, FIG. 25 is a detail view of the section XXV in FIG. 23, FIG. 26 is a detail view in perspective of the section XXVI in FIG. 22, FIG. 27 is a detail view of the section XXVII in FIG. 22, FIGS. 28-34 are drawings corresponding to those in FIGS. 21-27, but of a second embodiment of the invention, and FIGS. 35-41 are drawings corresponding to those in FIGS. 21-27 and 28-34, but of a third embodiment of the invention.

DETAILED DESCRIPTION OF THE INVENTION

Figure 1:
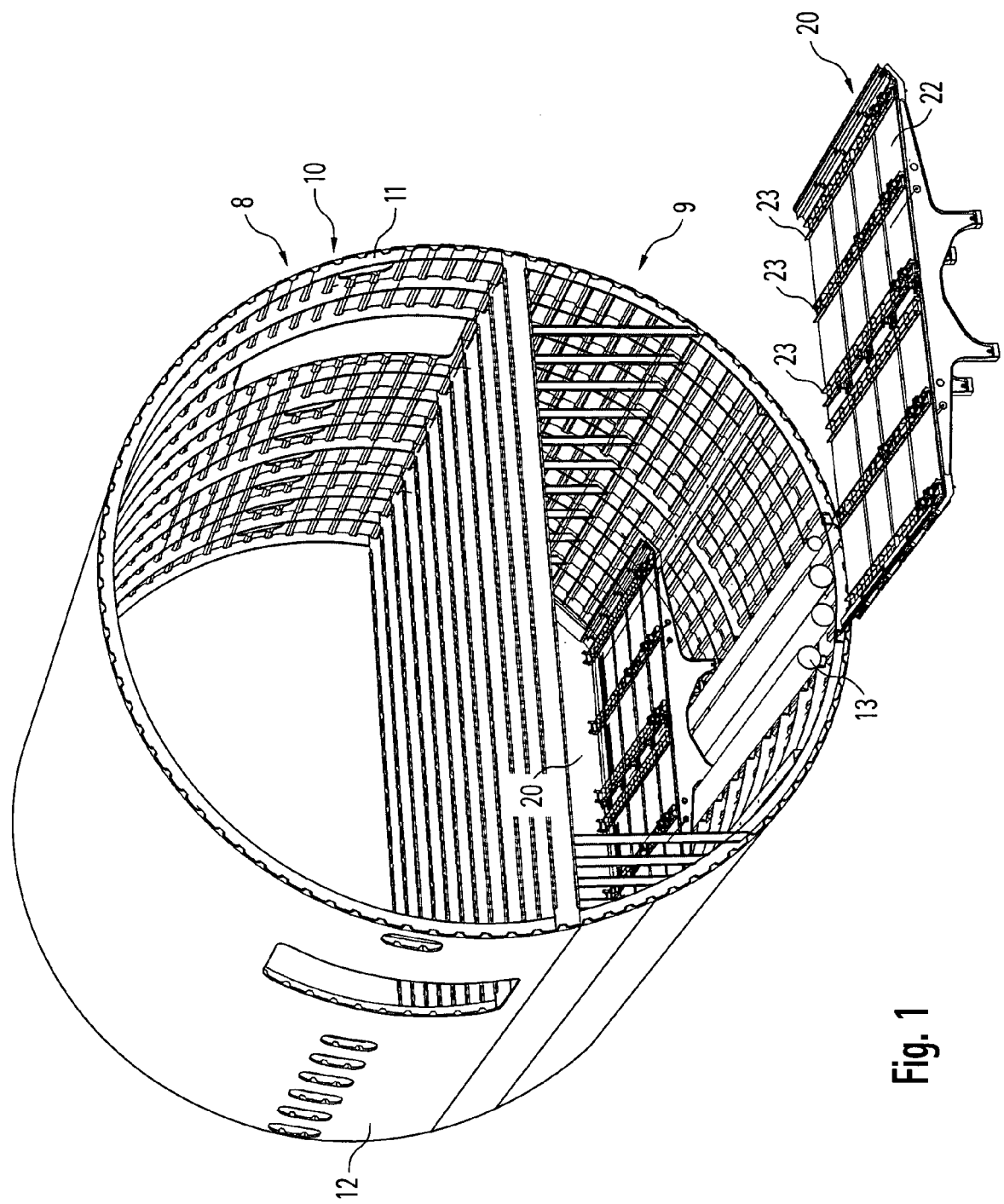
FIG. 1 is a perspective view of a fuselage section of an aircraft.

In the following description, the same reference numerals are used for identical parts or parts with identical actions.

As shown in FIG. 1, an aircraft fuselage 10 is subdivided (as is known) into an upper section 8 to be used as passenger compartment and a lower section to form a cargo compartment 9. The aircraft fuselage 10 is formed by an outer skin 12 that is reinforced by attaching ribs 11 to its inner surface. The outer skin and the ribs can be made of light metal or of a composite material.

Within the cargo compartment 9 are mounted deck sections 20 that together constitute a cargo deck. In the bilge space (below the deck sections 20) are disposed installation channels 13, conductors etc., which serve to supply both the passenger compartment and the cargo compartment with fluids (air, water, waste water, etc.) or electricity (as a source of energy, for data transmission, etc.).

Figure 2:
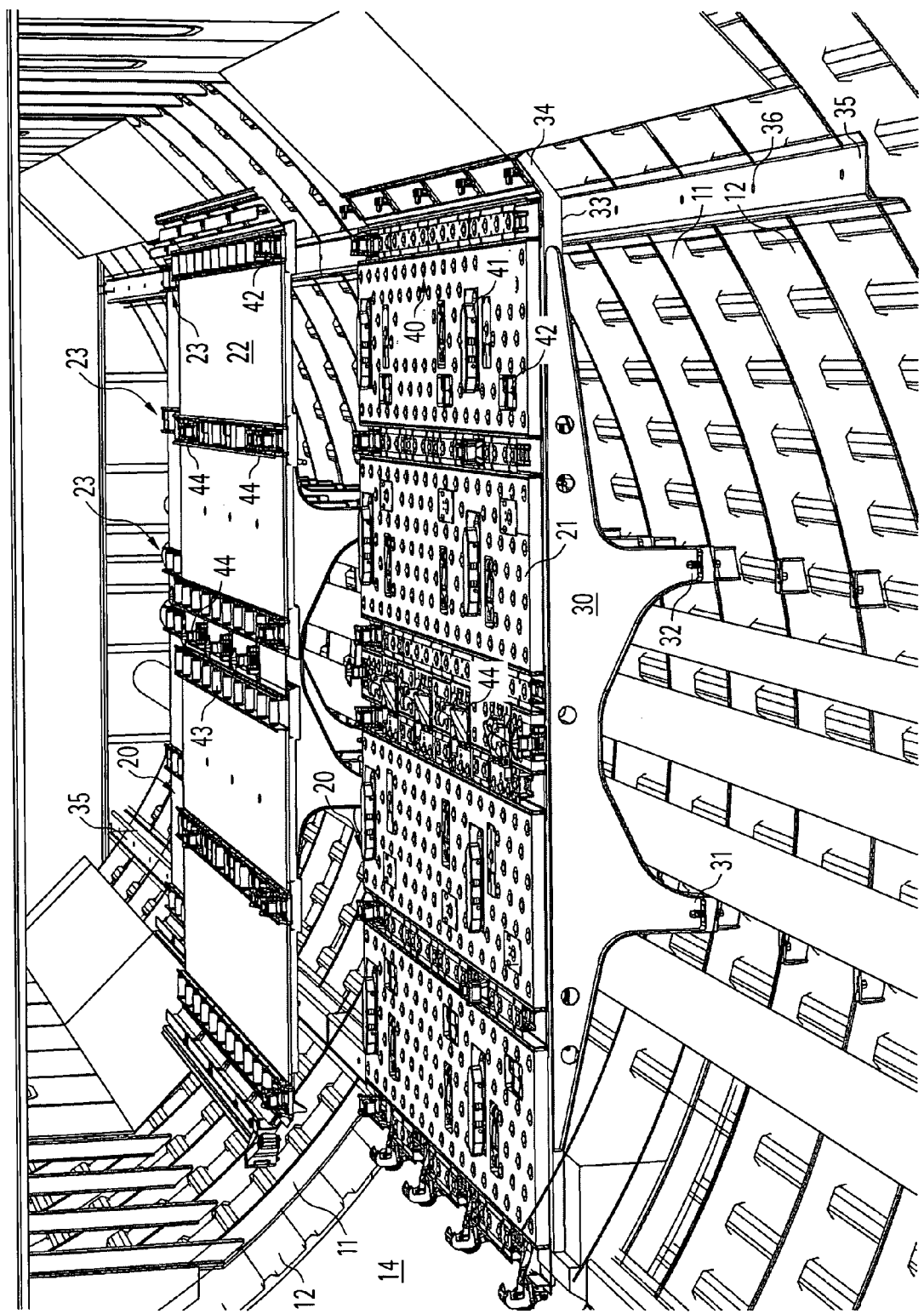
FIG. 2 is a perspective view of a cargo-loading compartment with deck sections partially installed.

As can be seen in FIG. 2, the deck sections 20 are made on one hand of flat elements such as floor panels 22 or ball mats 21, which are connected to one another by way of profile elements 23 oriented parallel to the long axis of the aircraft. These flat elements 21, 22 are preferably screwed or riveted to the profile elements 23, so as to produce a rigid structure extending over the entire width of the deck section 20. In the profile elements are fastened a plurality of functional units, e.g. PDUs 42 (roller drive units), transport rollers 43 or latches 44. In the region of a cargo-compartment door, and hence in the region of the ball mats 21, are additionally attached ball elements 40, guide elements 41 and a plurality of other PDUs 42 and latches 44, as is known per se.

For stiffening the deck sections 20 and transmitting vertically imposed loads, transverse beams 30 are provided below the flat elements 21, 22 and profile elements 23; these beams comprise feet 31, 32 and, at their outer edges, bearing surfaces 33. The feet 31, 32 of the transverse beams 30 are fixed to ribs 11, whereas the bearing surfaces 33 are seated on longitudinal profiles 35 that are attached to the ribs 11 along an outer zone of the aircraft fuselage. In addition, the transverse beams 30 comprise peripheral collars 34, to which are attached other guide elements for containers that will be received.

Figure 3:
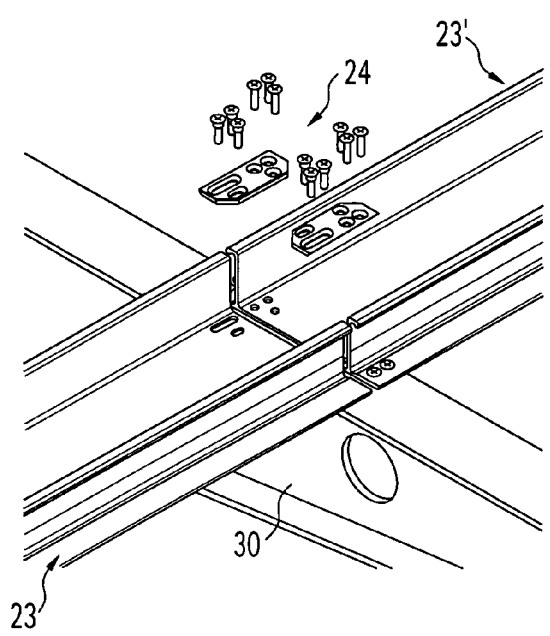
FIGS. 3 and 4 are perspective views showing the mounting of profile elements on transverse beams.
Figure 4:
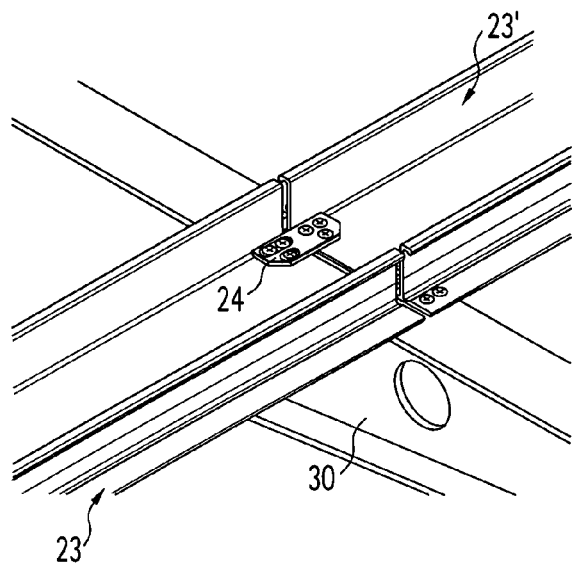

After the deck sections 20 have been installed in the loading space they are connected to one another by means of the profile elements 23, as shown in FIGS. 3 and 4. Connection elements 24 provided for this purpose have the form of slots, so that two deck sections 20 that have been coupled together can be shifted with respect to one another, by a certain amount, in the direction of the long axis of the aircraft.

Figure 5:
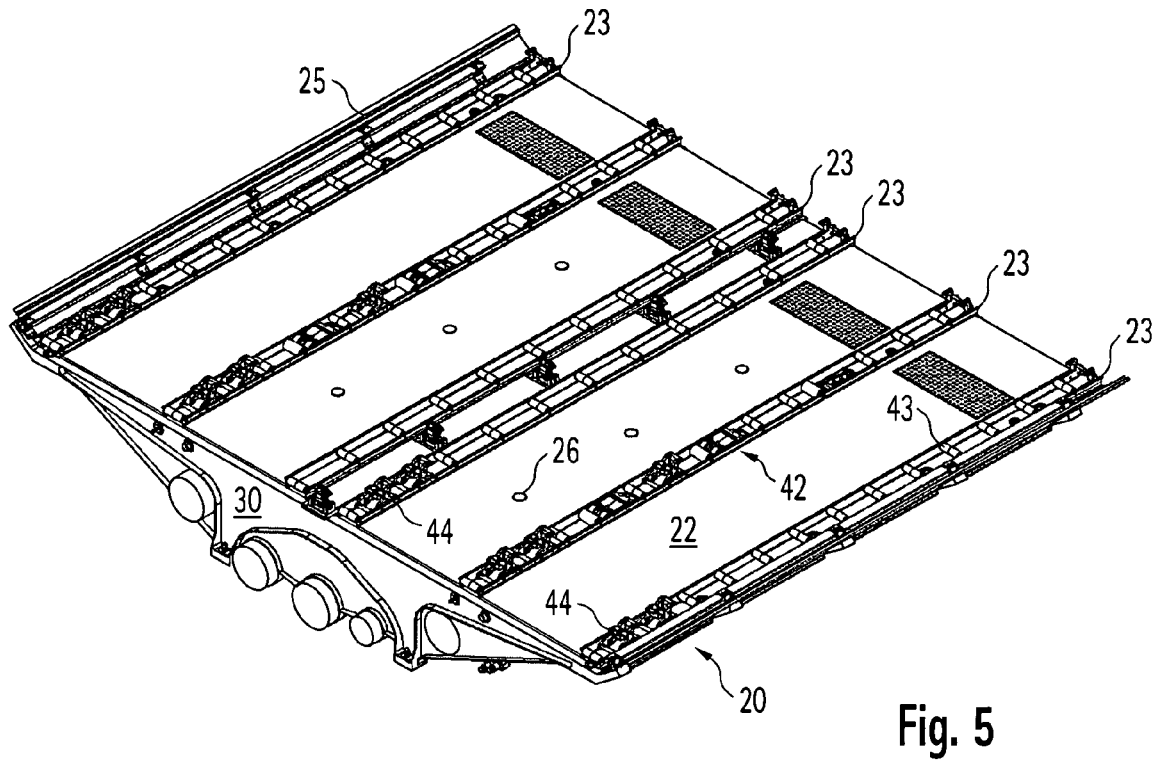
FIG. 5 is a perspective view of a floor module from above.
Figure 6:
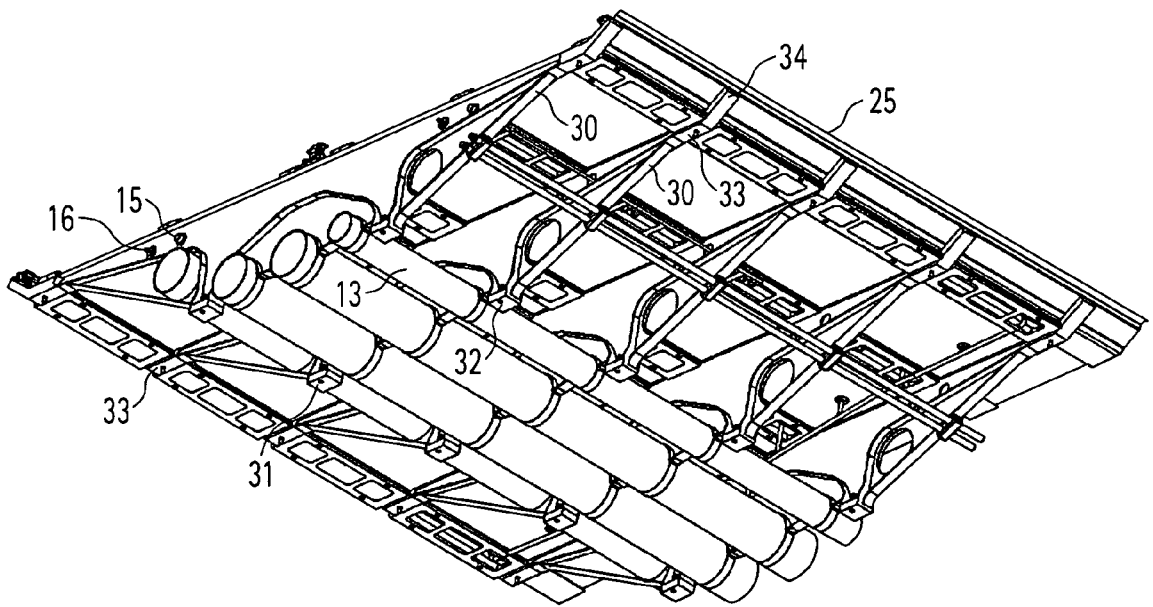
FIG. 6 shows the floor module according to FIG. 5 in perspective from below.

The deck sections 20 shown in FIGS. 5 and 6 form compact modules that consist on one hand of the flat sections 21 and/or 22, connected together by the profile elements 23, and on the other hand of the transverse beams 30. Furthermore, these modules can be provided in certain sections with the installation channels 13 as well as drainage conduits 16 (to remove water from the cargo deck) or with electrical leads, which can be connected to one another by way of connector sockets 15 between the modules.

The modular deck sections thus constructed are endowed with a stiffness with respect to shear forces, owing to the rigid connection between the flat sections 21, 22 and the profile elements 23, such that longitudinal forces, introduced for instance by way of latches 44 in the middle of a deck section (see FIG. 5), are transmitted outward, in the direction toward edge profiles 25 or the profile elements 23 disposed near the latter. From there these longitudinal forces—as is described below—are transmitted to the skin of the aircraft.

Figure 7:
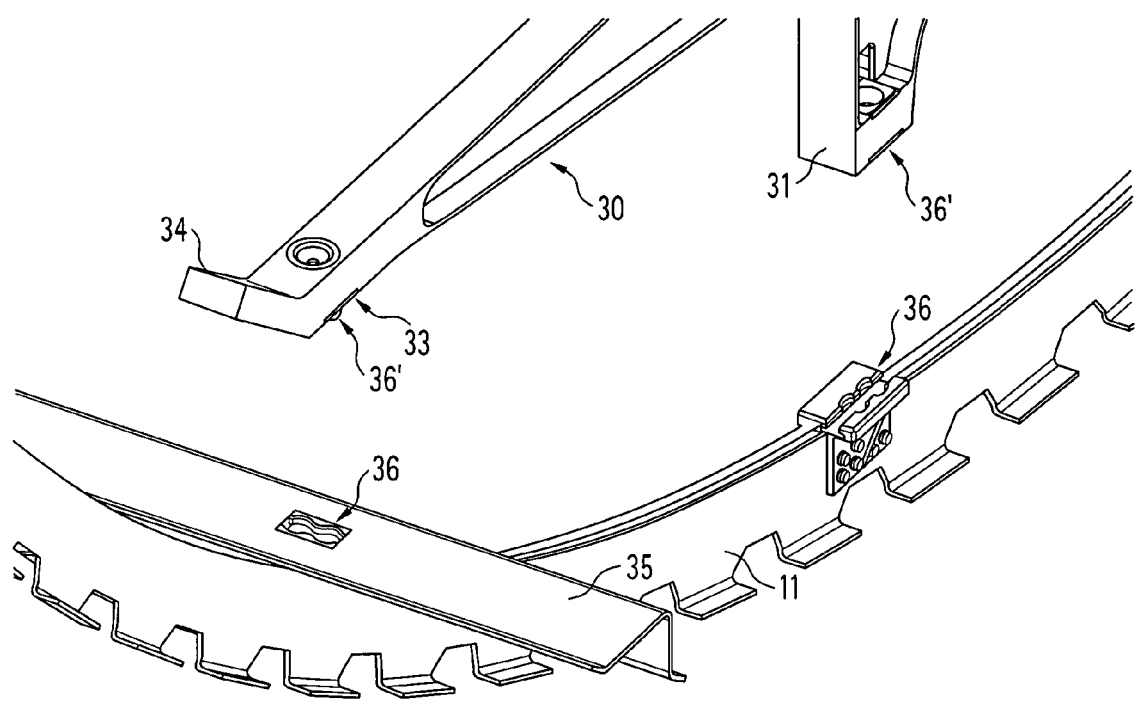
FIG. 7 is a sectional representation in perspective of the mounting of a transverse beam in the aircraft.

FIG. 7 shows how the transverse beams 30 are connected to the ribs 11 and/or longitudinal profiles 35 as the deck sections or modules are being installed in the cargo space. For this purpose, firstly there are provided, on the ribs 11 and longitudinal profiles 35, fixation elements 36 such as are known and have been well tested for use in the fixation of aircraft seats. Secondly, corresponding counter-fixation elements 36' are provided on the feet 31 and/or the bearing surfaces 33 of the transverse beams 30. This means that during installation of a deck section or module in the cargo compartment, the module need merely be lifted into the cargo compartment and fixed in place there by means of the fixation elements 36, 36'. Fixation of the transverse beams 30 to the longitudinal profiles 35 can be done from above, while for fixation of the feet 31 to the ribs 11 either access openings 26 (see FIG. 5) are provided in the floor panels 22 or the ball mats 21, or else at the important sites these elements are not yet fixedly attached to the profile elements during installation.

To transmit the longitudinal forces from the deck sections 20 to the outer skin 12 of the aircraft fuselage 10 intermediate elements 50 are provided, which in the following will be described in detail with reference to FIGS. 8-10. Furthermore, these intermediate elements 50 comprise on one hand an outer coupling piece 51, e.g. a band-shaped region, that is rigidly fixed to the outer skin 12 between two ribs 11, for instance by adhesive or rivets. In addition the intermediate element 50 comprises an inner coupling piece 52, which is connected to the peripheral profile 23 of a deck section 20 so that it cannot be pulled loose (in the direction of the aircraft long axis). The connecting piece 53 disposed between the inner coupling piece 52 and the outer coupling piece 51 is in turn stiff with respect to shear forces but relatively yielding with respect to bending forces, so that forces in the direction of the profile elements 23, i.e. in the long direction of the aircraft fuselage 10, are transferred from the profile elements 23 through the intermediate elements 50 to the outer skin 12, whereas forces perpendicular thereto, i.e. those acting downward and outward, are transferred only very slightly to the outer skin 12. Mounting of the intermediate elements 50 can be carried out especially simply when the elements comprise outer lobes 54 by way of which the intermediate elements 50 are fixed to the ribs 11.

The intermediate elements 50 are very short in relation to the overall length (in the aircraft long direction) of the deck sections 20, and in the example shown here they are provided at only one end of each outer profile element 23 of a deck section 20. This ensures that when the materials used for outer skin 12 and deck sections 20 are extended to different degrees, for instance owing to temperature differences, and have different coefficients of expansion, no tensions can arise between the outer skin and the deck sections 20. That is, in the long direction of the aircraft one end of each deck section 20 is fixed to the aircraft fuselage 10, whereas its other end is seated so as to be floating in the aircraft long direction. Only forces directed perpendicular to the long axis of the aircraft are transmitted over the entire length of the deck sections 20 in the aircraft fuselage 10.

Figure 12:
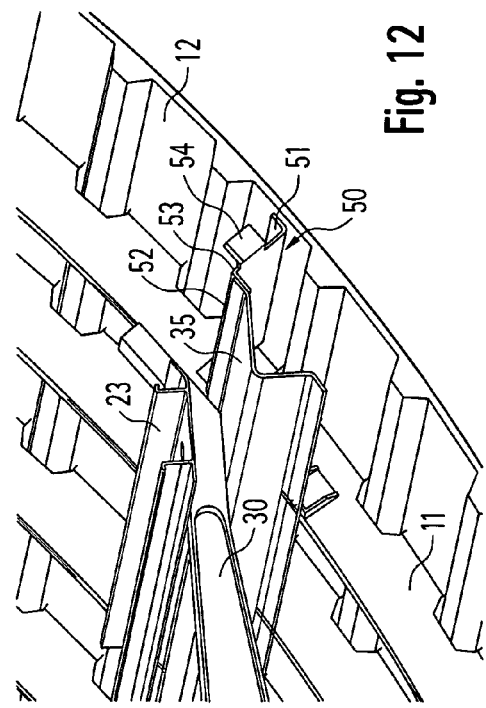
FIGS. 11-13 are views, corresponding to those in FIGS. 8-10, of a second embodiment of intermediate elements.
Figure 11:
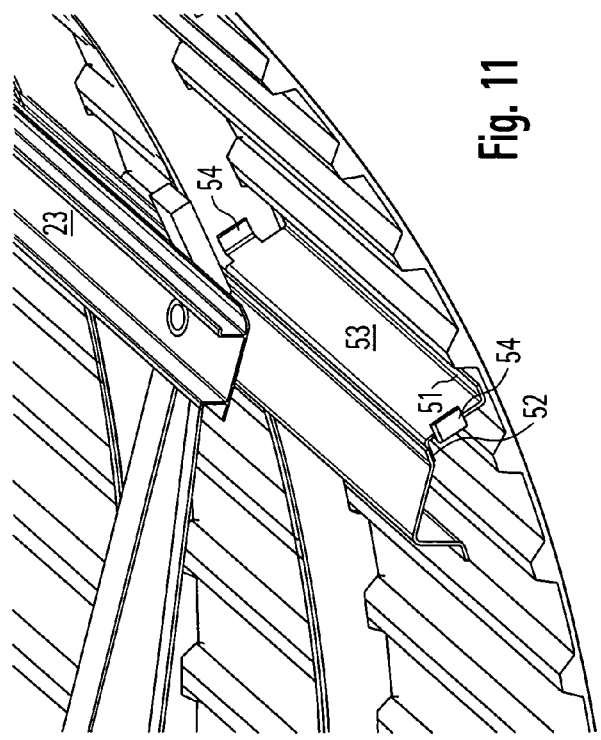
Figure 13:
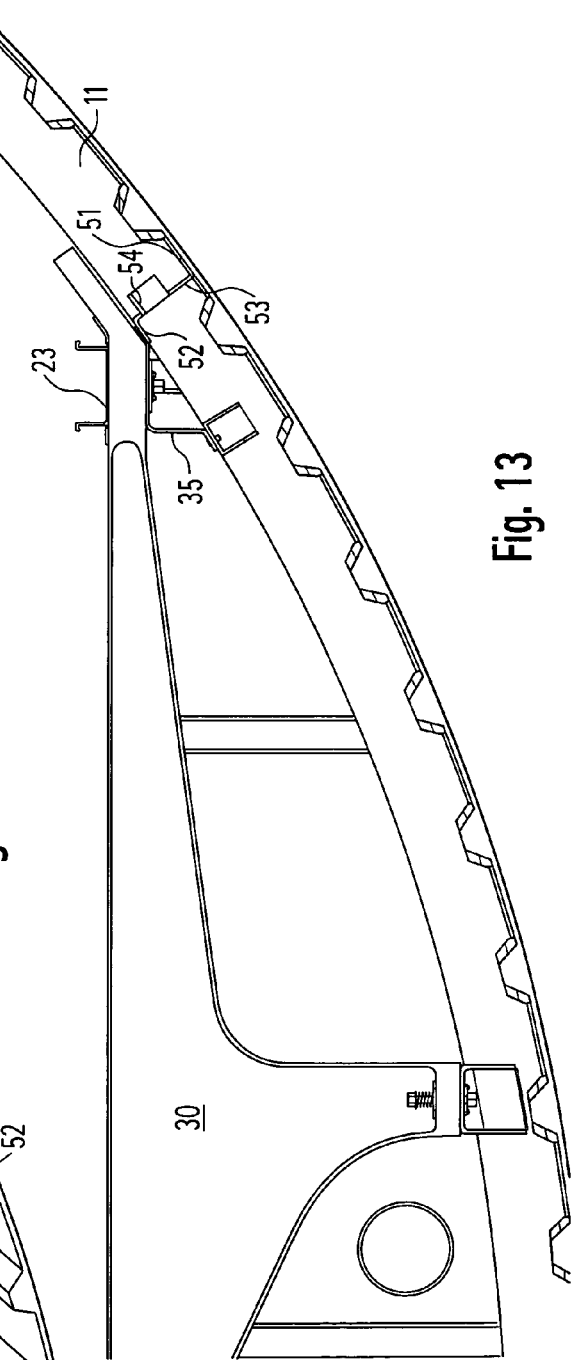

The embodiment of the invention shown in FIGS. 11-13 differs from the one in FIGS. 8-10 in that the intermediate elements 50 are coupled to the longitudinal profiles 35 on which are seated the deck sections 20 by way of the bearing surfaces 33 of their transverse beams 30, on which in turn the profile elements 23 are mounted. With this arrangement, therefore, the longitudinal forces are transmitted into the intermediate elements 50 not directly but rather by way of end sections of the transverse beams 30 and sections of the longitudinal profiles 35, and thus transmitted to the outer skin 12. With respect to function, however, there is no difference between this arrangement and the embodiment according to FIGS. 8-10, because also in this embodiment the transmission of longitudinal forces applied over the entire width of the deck sections 20 is initially outward into the outermost profile elements 23 situated there, followed by (substantially punctate) transfer to the intermediate elements 50 and on to the outer skin 12. Here again, therefore, the transverse beams 30 are not directly involved in the transmission of the longitudinal forces and hence can be constructed so that they are yielding or weak with respect to such forces.

In the following, the mounting is described in greater detail with reference to FIGS. 14-20.

Figure 14:
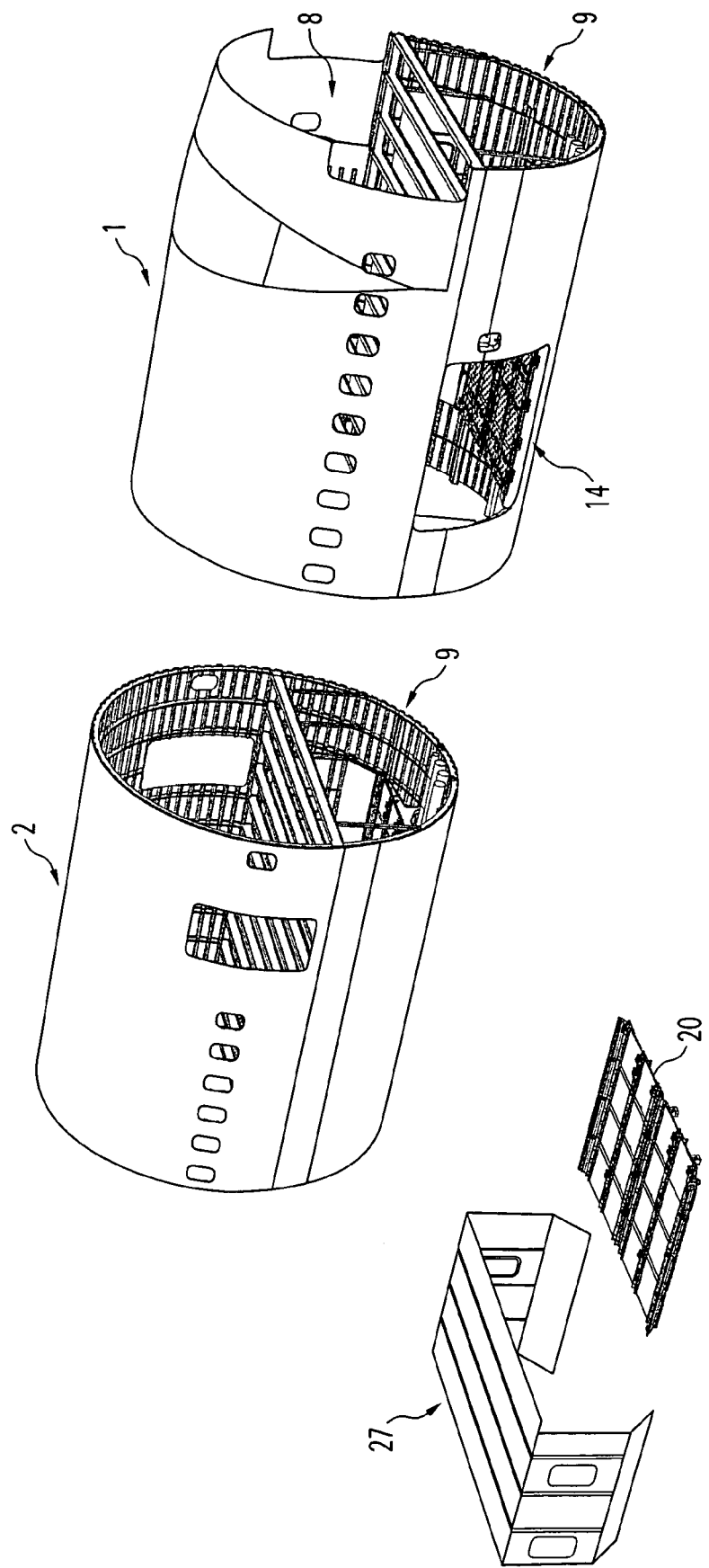
FIG. 14 shows two fuselage sections separated from one another, with a floor module that is to be installed and a wall/ceiling lining module.

As shown in FIG. 14, the aircraft is composed of several fuselage sections, only two of which are illustrated here. The front fuselage section 1 in FIG. 14 contains the cargo-compartment door 14, and the second fuselage section 1 is immediately adjacent to the back of the first section. The deck section shown in FIG. 14 is installed in these fuselage sections, as is the wall/ceiling lining section 27.

Figure 15:
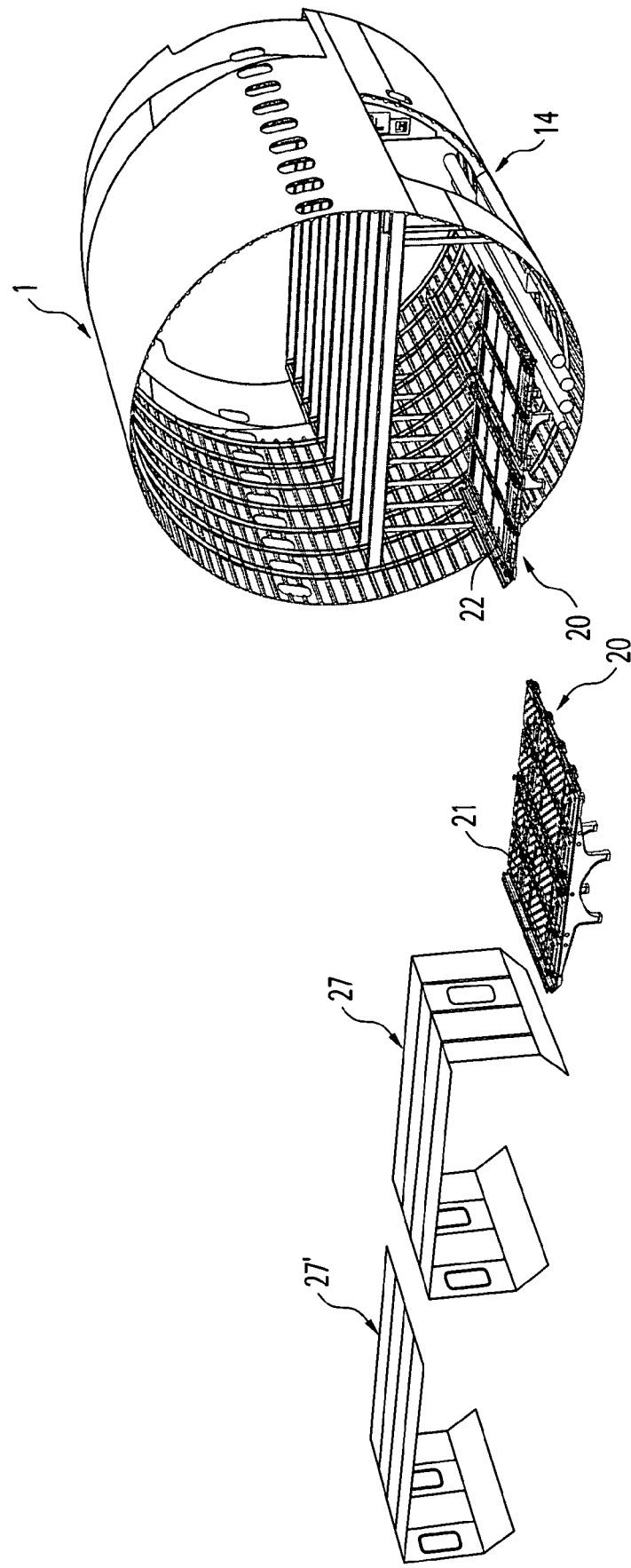
FIGS. 15-20 are additional drawings, like that in FIG. 14, to explain further installation steps.

FIG. 15 shows the first fuselage section 1, into which a deck section 20, i.e. a corresponding module with floor panels 22, has just been inserted. For clarification, a module 20 with ball mats 21 is shown separately. In addition, the figure shows a wall/ceiling lining element 27 (like that in FIG. 14), which is mounted apart from the cargo-compartment door 14 and which comprises two side walls, whereas the wall/ceiling lining element 27' in FIG. 15 is intended for installation in the door region.

Figure 16:
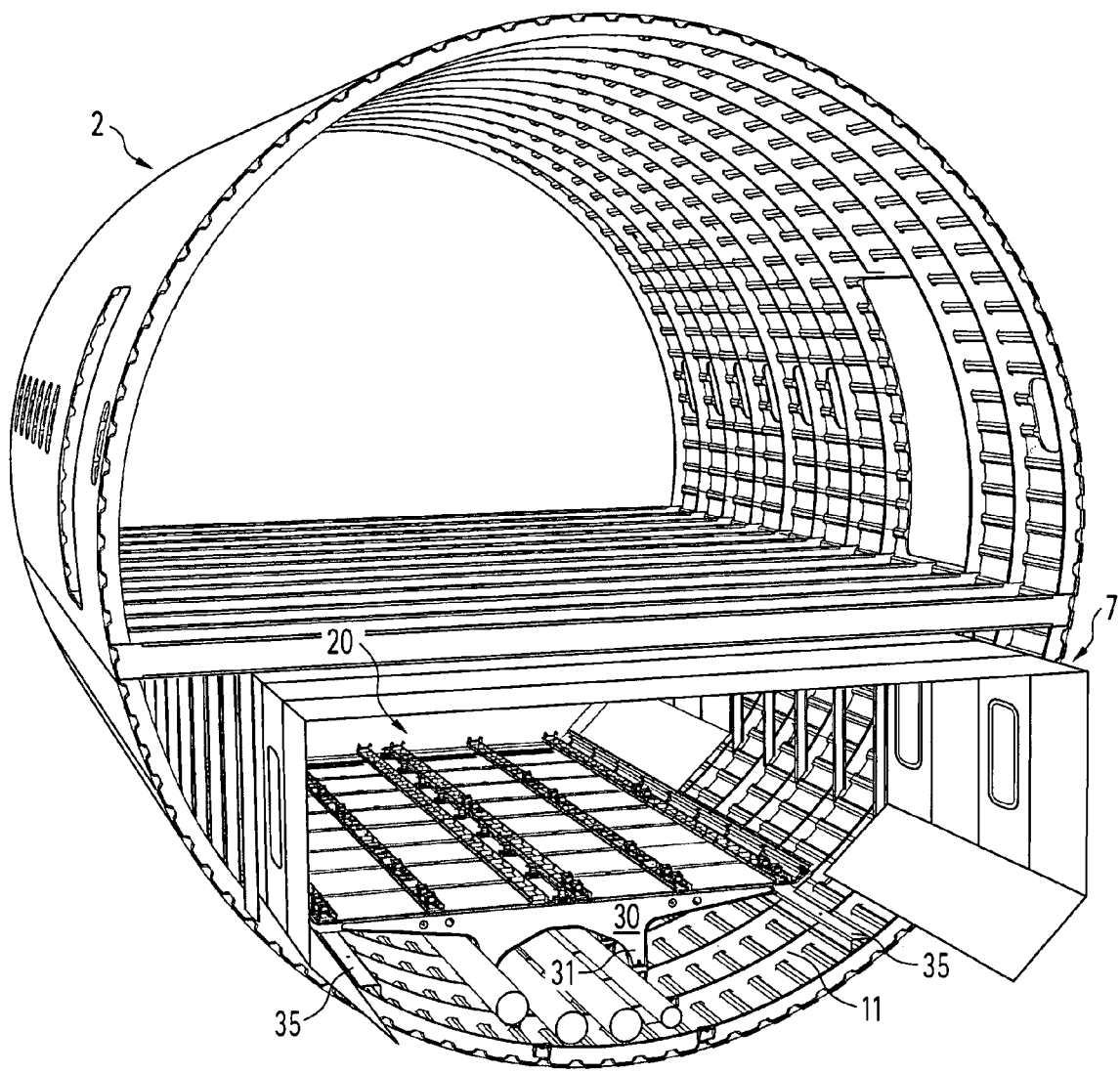
Figure 17:
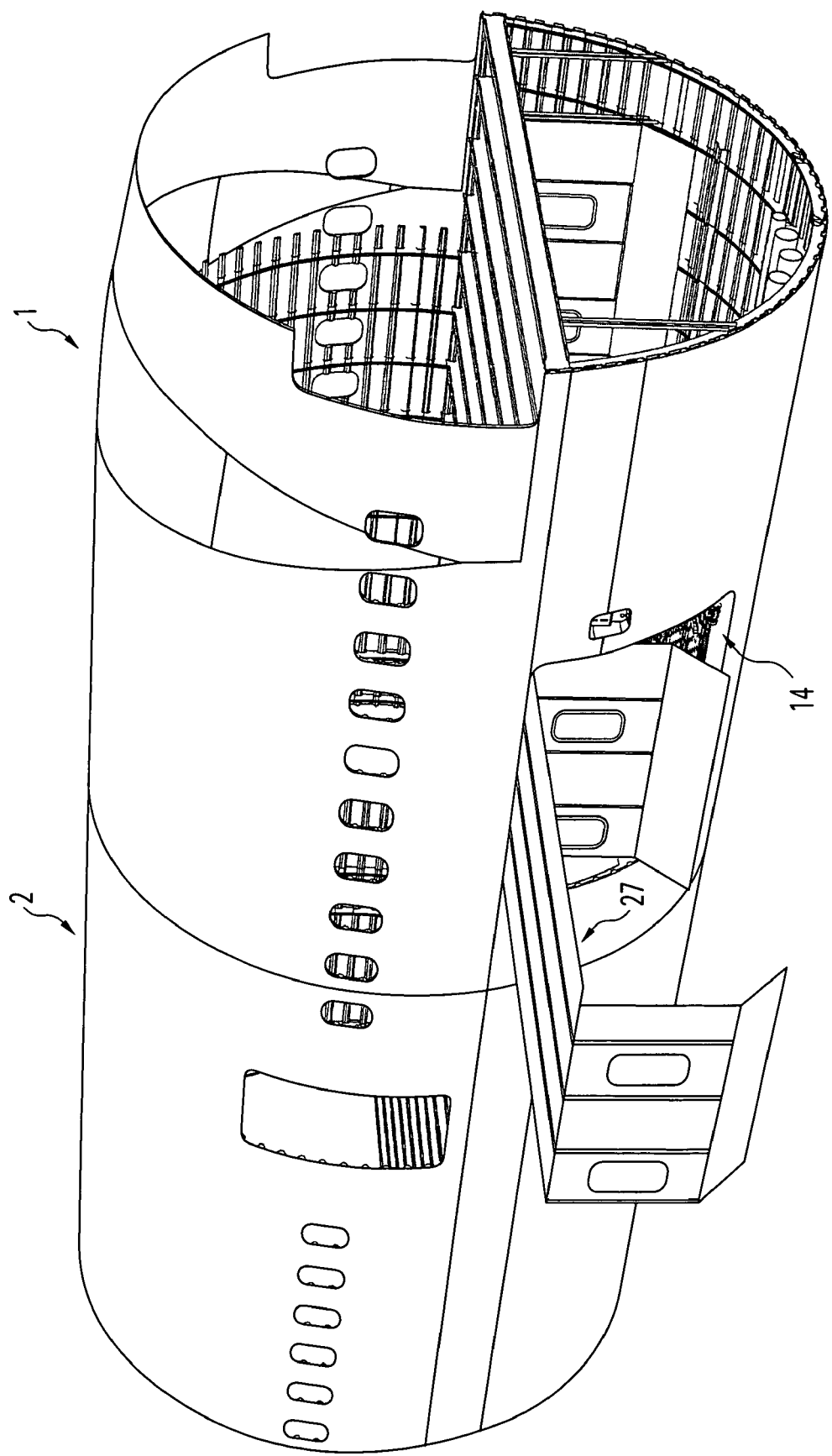

FIG. 16 shows how a module 20 is pushed into the fuselage section 2, and there is set onto the edge profile 25 and attached thereto (as shown in more detail in FIG. 7) by means of the fixation elements 36, 36'. The feet 31 of the transverse beam 30 are attached to the ribs 11. After this attachment has been completed, the wall/ceiling lining element 27 is pushed into the fuselage section 2 and is likewise fixed in position.

This installation, and of course also a dismantling for the purpose of exchange as well as subsequent installation of the wall/ceiling lining element, can be done through the cargo-compartment door 14.

Figure 18:
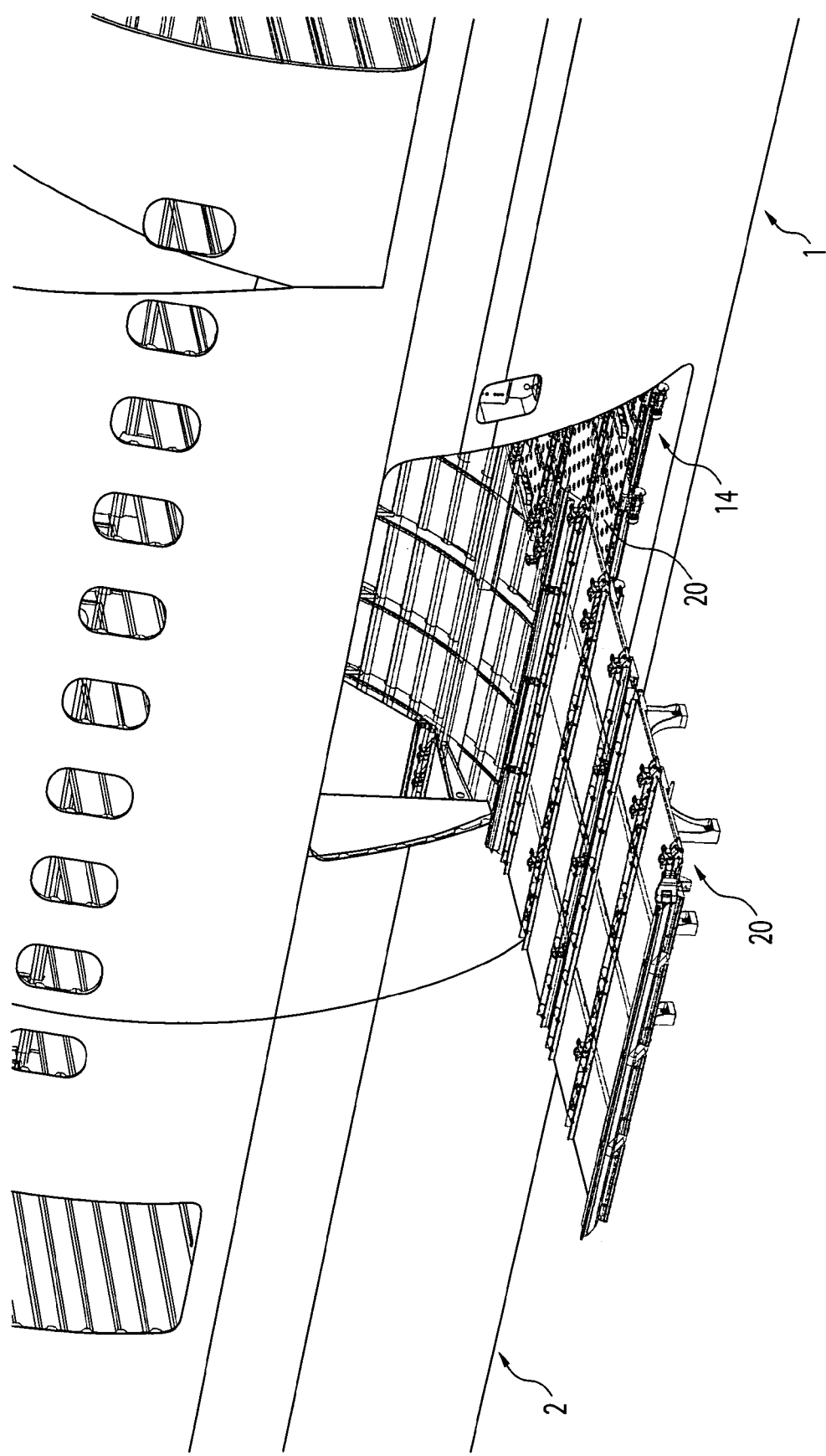
Figure 19:
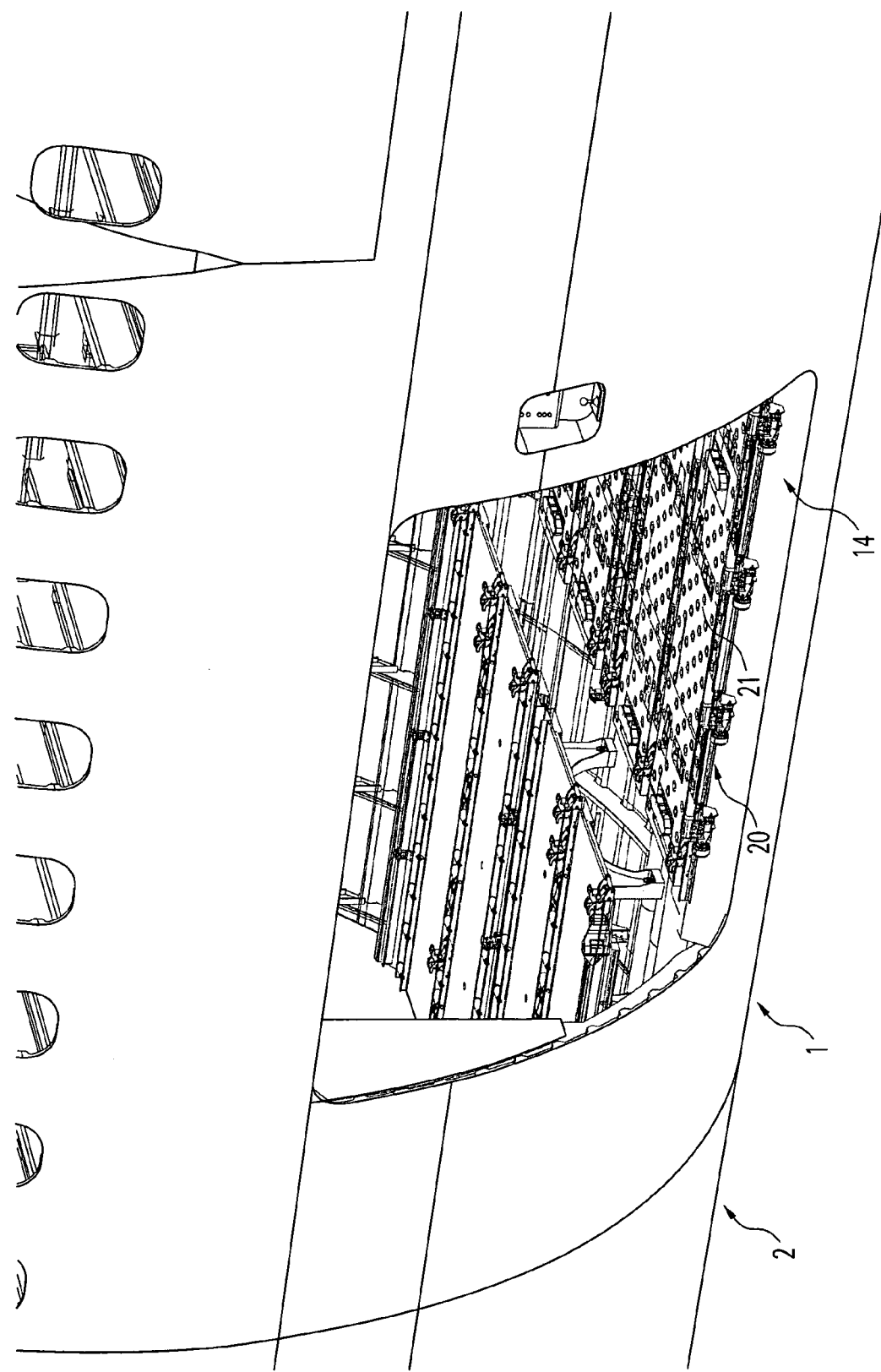
Figure 20:
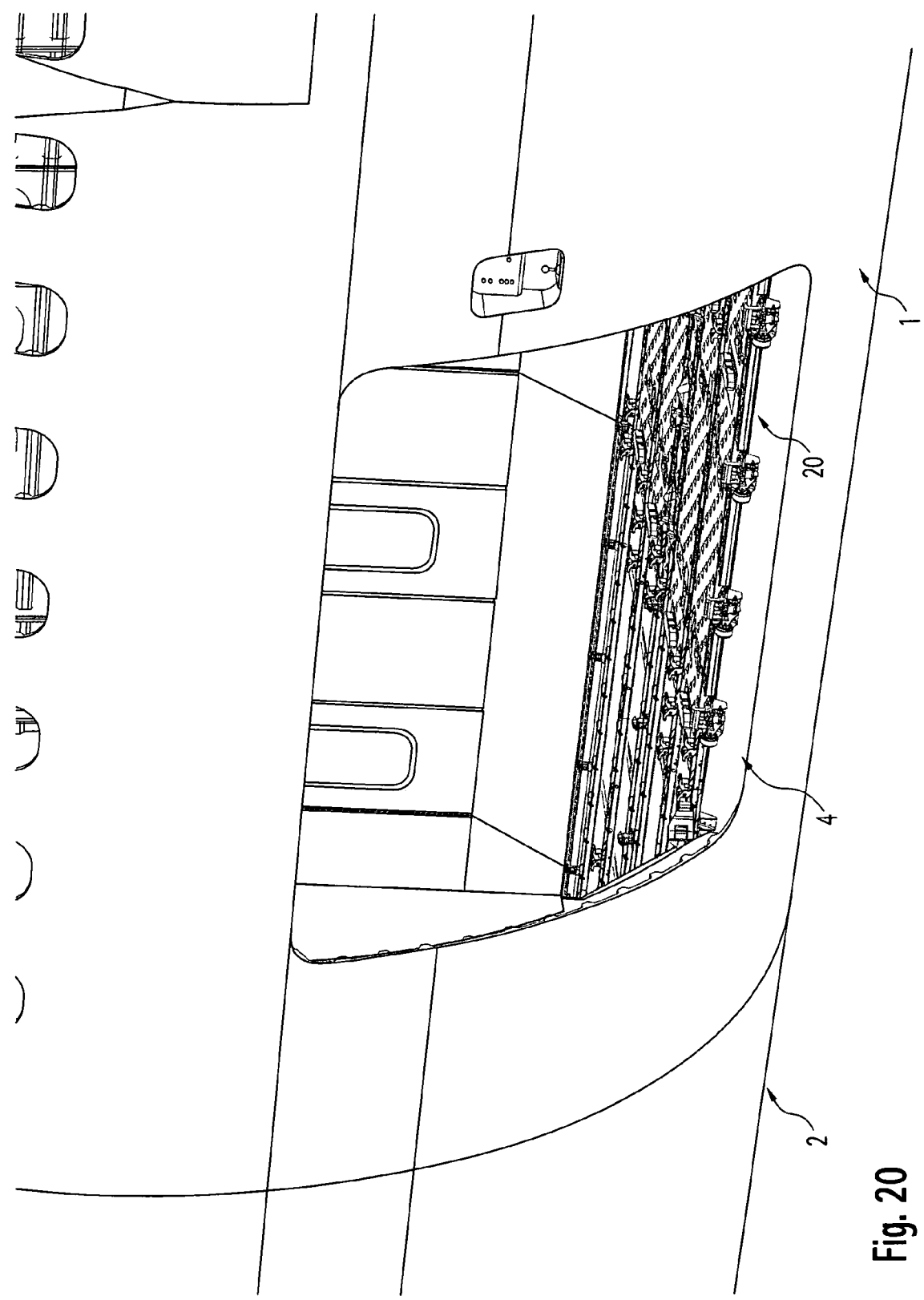

This clearly also applies to the deck sections or modules, as shown in FIG. 18. In particular, for this purpose—as shown in FIG. 19—at a time when the fuselage sections 1 and 2 shown here have already been connected to one another, initially a module 20 with ball mats 21 is installed in the region of the cargo-compartment door 14, after which an adjacent module (as shown in FIG. 18) is loaded in through the cargo-compartment door 14 and—as shown in FIG. 19—pushed over the already installed module 20 and finally—as shown in FIG. 20—is fixed in its designated position within the cargo compartment.

In the following another way to attach the transverse beam 30 or longitudinal profile 35 to the outer skin is explained. At this juncture it should be emphasized that the outer skin concerned in the present description and shown in the drawings can also be "compact", e.g. constructed in sandwich form, so that the ribs 11 or other (customary) longitudinal elements for stiffening the outer skin 12 as shown in the drawings are no longer visible at least from outside the skin (if they are even present as structures at all), because the present procedure produces an outer skin that is smooth even on its inner surface.

The embodiment shown in FIGS. 21 to 27 is distinguished by the fact that the longitudinal profiles 35 or sections thereof, which thus serve as intermediate elements 50, each traverse a longitudinal stiffening element 37 before being connected to the outer skin 12. Here, again, the longitudinal beams 35 if suitably shaped can span the entire length of the aircraft, or can also be constructed as short sections (as shown in the drawings).

The embodiment of the invention shown in FIGS. 28-34 is distinguished by the fact that the longitudinal profile 35 is constructed as a "shoe", which is attached directly to the transverse beam 30 or is formed integrally therewith. This "shoe" is fixed to the longitudinal stiffening element 37 by way of fixation elements 36, as is particularly evident in FIGS. 31-34. As shown in the figures, this also applies to the feet 32 of the transverse beam 30.

In the embodiment of the invention shown in FIGS. 35-41 the longitudinal profiles 35 are as a whole constructed so as to traverse two longitudinal stiffening elements 32. In this case the longitudinal profiles 35 can either pass over the entire length of the aircraft interior or be only short sections (as can be seen in FIGS. 35 and 36), constructed as short, shoe shaped sections. They then represent, so to speak, intermediate elements 50 through which longitudinal forces are transmitted directly to the outer skin 12.

At this juncture it should once again be emphasized that a substantial point resides in the fact that the longitudinal forces are introduced over the entire floor regions and (as determined statically) are transferred to the outer skin at end corners of the floor modules and/or at ends of the transverse beams.

List of Reference Numerals
1 First fuselage section
2 Second fuselage section
8 Upper section
9 Cargo compartment
10 Aircraft fuselage
11 Ribs
12 Outer skin
13 Connection channel
14 Cargo-compartment door
15 Installation socket
16 Drainage conduit
20 Deck section
21 Ball mat
22 Floor panel
23 Roller conveyor/profile element
24 Connection element
25 Edge profile
26 Access opening
27 Wall/ceiling lining
30 Transverse beam
31 Foot
32 Foot
33 Bearing surface
34 Collar
35 Longitudinal profile
36,36' Fixation element
37 Longitudinal stiffening element 40 Ball element
41 Guide element
42 PDU
43 Roller
44 Latches
50 Intermediate element
51 Outer coupling piece
52 Inner coupling piece
53 Connecting piece
54 Outer lobe

The invention claimed is:
1. An aircraft having a fuselage comprising an outer skin, said aircraft comprising:
a cargo deck being adapted to receive loads and comprising a plurality of floor modules, which are fixed within the a cargo compartment and define said cargo deck, and
a plurality of longitudinal profiles attached to ribs running about an inner circumference of the skin, the ribs connected to said outer skin, and
wherein each of said floor modules comprises at least a first and a second transverse beam that extend across of a width of said cargo compartment, each end of said transverse beams resting on an upper surface of a respective one of said longitudinal profiles,
each of said floor modules comprises a plurality of profile elements that extend in a longitudinal direction of said aircraft along a respective upper surface of at least one of said floor modules, said plurality of profile elements comprising at least one peripheral profile located at an edge region of the respective floor module proximate to said outer skin; and
said at least one peripheral profile is connected to said outer skin by means of a plurality of intermediate elements such that forces in said longitudinal direction of said aircraft are transferred from said at least one peripheral profile to said outer skin, whereas forces perpendicular to said longitudinal direction of said aircraft are transferred to the ribs.

2. Cargo deck according to claim 1, wherein said modules are decoupled from one another with respect to forces acting in the long direction of the aircraft.

3. The aircraft of claim 1, wherein
a bottom surface of said at least one peripheral profile abuts an upper surface of said at least one of said plurality of intermediate elements.

4. The aircraft of claim 1, wherein
said longitudinal profiles and said intermediate elements are manufactured from a sheet material.

5. An aircraft having a fuselage comprising an outer skin, said aircraft comprising:
a cargo compartment being adapted to receive loads and comprising a plurality of floor modules, which are fixed within the cargo compartment and define a cargo deck, and
a plurality of longitudinal profiles attached to ribs running about an inner circumference of the skin, the ribs connected to said outer skin,
wherein each of said floor modules comprises at least a first and a second transverse beam that extend across of a width of said cargo compartment, each end of said transverse beams resting on an upper surface of a respective one of said longitudinal profiles,
each of said floor modules comprises a plurality of profile elements that extend in a longitudinal direction of said aircraft along a respective upper surface of at least one of said floor modules, said plurality of profile elements comprising at least one peripheral profile located at an edge region of the respective floor module proximate to said outer skin; and
said at least one peripheral profile is connected to said outer skin by means of a plurality of intermediate elements such that forces in said longitudinal direction of said aircraft are transferred from said at least one peripheral profile to said outer skin, whereas forces perpendicular to said longitudinal direction of said aircraft are transferred to the ribs, wherein said transverse beam having at least one supporting foot configured and adapted to be fastened to the fuselage of said aircraft at a bottom region of said aircraft, the supporting foot being adapted to transmit vertical loads on the floor modules to the fuselage.

6. An aircraft having a fuselage comprising an outer skin, said aircraft comprising:
a cargo compartment being adapted to receive loads and comprising a plurality of floor modules, which are fixed within the cargo compartment and define a cargo deck, and
a plurality of longitudinal profiles attached to ribs running about an inner circumference of the skin, the ribs connected to said outer skin,
wherein each of said floor modules comprises at least a first and a second transverse beam that extend across of a width of said cargo compartment, each end of said transverse beams resting on an upper surface of a respective one of said longitudinal profiles,
each of said floor modules comprises a plurality of profile elements that extend in a longitudinal direction of said aircraft along a respective upper surface of at least one of said floor modules, said plurality of profile elements comprising at least one peripheral profile located at an edge region of the respective floor module proximate to said outer skin; and
said at least one peripheral profile is connected to said outer skin by means of a plurality of intermediate elements such that forces in said longitudinal direction of said aircraft are transferred from said at least one peripheral profile to said outer skin, whereas forces perpendicular to said longitudinal direction of said aircraft are transferred to the ribs, wherein at least one of said longitudinal beams profiles and said ribs comprise at least one of bores, rapid-closure elements and fixation devices for attachment of the floor modules thereto.

7. An aircraft having a fuselage comprising an outer skin, said fuselage comprising multiple barrel-shaped fuselage sections, said aircraft comprising:
a cargo compartment being adapted to receive loads and comprising a plurality of floor modules, which are fixed within the cargo compartment and define a cargo deck, and
a plurality of longitudinal profiles attached to ribs running about an inner circumference of the skin, the ribs connected to said outer skin,
wherein each of said floor modules comprises at least a first and a second transverse beam that extend across of a width of said cargo compartment, each end of said transverse beams resting on an upper surface of a respective one of said longitudinal profiles, each of said floor modules comprises a plurality of profile elements that extend in a longitudinal direction of said aircraft along a respective upper surface of at least one of said floor modules, said plurality of profile elements comprising at least one peripheral profile located at an edge region of the respective floor module proximate to said outer skin; and said at least one peripheral profile is connected to said outer skin by means of a plurality of intermediate elements such that forces in said longitudinal direction of said aircraft are transferred from said at least one peripheral profile to said outer skin, whereas forces perpendicular to said longitudinal direction of said aircraft are transferred to the ribs.

8. An aircraft having a fuselage comprising an outer skin, said fuselage comprising multiple barrel-shaped fuselage sections, said aircraft comprising:

a cargo compartment being adapted to receive loads and comprising a plurality of floor modules, which are fixed within the cargo compartment and define a cargo deck, and a plurality of longitudinal profiles attached to ribs running about an inner circumference of the skin, the ribs connected to said outer skin, wherein each of said floor modules comprises at least a first and a second transverse beam that extend across of a width of said cargo compartment, each end of said transverse beams resting on an upper surface of a respective one of said longitudinal profiles, wherein said transverse beams comprise at least one of either bores and rapid-closure elements for attaching said floor modules to said longitudinal profiles;

each of said floor modules comprises a plurality of profile elements that extend in a longitudinal direction of said aircraft along a respective upper surface of at least one of said floor modules, said plurality of profile elements comprising at least one peripheral profile located at an edge region of the respective floor module proximate to said outer skin; and said at least one peripheral profile is connected to said outer skin by means of a plurality of intermediate elements such that forces in said longitudinal direction of said aircraft are transferred from said at least one peripheral profile to said outer skin, whereas forces perpendicular to said longitudinal direction of said aircraft are transferred only very slightly to said outer skin by said intermediate elements, to the ribs wherein at least one of said longitudinal beams profiles and said ribs comprise at least one of bores, rapid-closure elements and fixation devices for attachment of the floor modules thereto.

\* \* \* \* \*